United States Patent
Rivas et al.

(10) Patent No.: US 7,622,815 B2
(45) Date of Patent: Nov. 24, 2009

(54) LOW VOLTAGE RIDE THROUGH SYSTEM FOR A VARIABLE SPEED WIND TURBINE HAVING AN EXCITER MACHINE AND A POWER CONVERTER NOT CONNECTED TO THE GRID

(75) Inventors: Gregorio Rivas, Pamplona (ES); Iker Garmendia, Ondarroa (ES); Josu Elorriaga, Plencia (ES); Jesus Mayor, Pamplona (ES); Javier Perez Barbachano, Pamplona (ES); David Sole, Pamplona (ES); Jorge Acedo, Pamplona (ES)

(73) Assignee: Ingeteam Energy, S.A., Sarriguren - Navarra (ES)

( * ) Notice: Subject to any disclaimer, the term of this patent is extended or adjusted under 35 U.S.C. 154(b) by 246 days.

(21) Appl. No.: 11/618,211

(22) Filed: Dec. 29, 2006

(65) Prior Publication Data

US 2008/0157529 A1    Jul. 3, 2008

(51) Int. Cl.
F03D 9/00 (2006.01)
H02P 9/04 (2006.01)
(52) U.S. Cl. .......................... 290/44; 290/55
(58) Field of Classification Search ............... 290/44, 290/55
See application file for complete search history.

(56) References Cited

U.S. PATENT DOCUMENTS

| | | | |
|---|---|---|---|
| 4,297,076 A | 10/1981 | Donham et al. ............ 416/37 |
| 4,400,659 A * | 8/1983 | Barron et al. ............ 322/32 |
| 4,994,684 A * | 2/1991 | Lauw et al. ............ 290/52 |
| 5,028,804 A * | 7/1991 | Lauw ............ 290/40 C |
| 5,083,039 A | 1/1992 | Richardson et al. ......... 290/44 |
| 5,225,712 A * | 7/1993 | Erdman ............ 290/44 |
| 5,798,631 A * | 8/1998 | Spee et al. ............ 322/25 |
| 6,137,187 A | 10/2000 | Mikhail et al. ............ 290/44 |
| 6,274,945 B1 * | 8/2001 | Gilbreth et al. ............ 290/52 |
| 6,420,795 B1 | 7/2002 | Mikhail et al. ............ 290/44 |
| 6,448,735 B1 * | 9/2002 | Gokhale et al. ............ 318/700 |
| 6,492,801 B1 | 12/2002 | Sims et al. ............ 324/142 |
| 6,566,764 B2 * | 5/2003 | Rebsdorf et al. ............ 290/44 |
| 6,600,240 B2 * | 7/2003 | Mikhail et al. ............ 307/85 |

(Continued)

FOREIGN PATENT DOCUMENTS

CA    2 537 999 A1    7/2005

(Continued)

OTHER PUBLICATIONS

Arsudis, Doppeltgespeister Drehstromgenerator mit Spannungszwischenkreis-Umrichter im Rotorkeis fur Windkraftanlagen, Dissertation, pp. 1-176.

(Continued)

*Primary Examiner*—Nicholas Ponomarenko
*Assistant Examiner*—Pedro J Cuevas
(74) *Attorney, Agent, or Firm*—Sughrue Mion, PLLC

(57) ABSTRACT

A variable speed wind turbine having a doubly fed induction generator (DFIG) includes an exciter machine mechanically coupled to the DFIG and a power converter placed between a rotor of the DFIG and the exciter machine which guarantees a stable voltage to the power converter. Thus, the power converter is not directly connected to the grid allowing the continuous operation of the system during a low voltage event in the grid.

15 Claims, 8 Drawing Sheets

U.S. PATENT DOCUMENTS

| | | | |
|---|---|---|---|
| 6,741,059 B2* | 5/2004 | Gokhale et al. | 318/700 |
| 6,847,128 B2 | 1/2005 | Mikhail et al. | 290/44 |
| 6,853,038 B2 | 2/2005 | Hayashi | 257/369 |
| 6,853,094 B2* | 2/2005 | Feddersen et al. | 290/44 |
| 6,856,039 B2 | 2/2005 | Mikhail et al. | 290/44 |
| 6,856,040 B2* | 2/2005 | Feddersen et al. | 290/44 |
| 6,856,041 B2* | 2/2005 | Siebenthaler et al. | 290/44 |
| 6,921,985 B2 | 7/2005 | Janssen et al. | 290/44 |
| 6,933,625 B2* | 8/2005 | Feddersen et al. | 290/44 |
| 7,038,330 B2 | 5/2006 | Rosebrock et al. | 290/44 |
| 7,042,110 B2* | 5/2006 | Mikhail et al. | 290/44 |
| 7,102,247 B2* | 9/2006 | Feddersen | 290/44 |
| 7,276,807 B2* | 10/2007 | Luetze et al. | 290/44 |
| 7,425,771 B2* | 9/2008 | Rivas et al. | 290/44 |
| 2002/0105189 A1 | 8/2002 | Mikhail et al. | 290/44 |
| 2003/0116970 A1 | 6/2003 | Weitkamp et al. | 290/44 |
| 2003/0151259 A1* | 8/2003 | Feddersen et al. | 290/44 |
| 2004/0217594 A1* | 11/2004 | Feddersen et al. | 290/44 |
| 2004/0217595 A1* | 11/2004 | Feddersen et al. | 290/44 |
| 2004/0222642 A1* | 11/2004 | Siebenthaler et al. | 290/44 |
| 2005/0012339 A1 | 1/2005 | Mikhail et al. | 290/44 |
| 2005/0122083 A1 | 6/2005 | Erdman | 322/20 |
| 2005/0253396 A1 | 11/2005 | Mikhail et al. | 290/44 |
| 2006/0163881 A1* | 7/2006 | Bucker et al. | 290/44 |
| 2006/0192390 A1* | 8/2006 | Juanarena Saragueta et al. | 290/44 |
| 2006/0238929 A1* | 10/2006 | Nielsen | 361/20 |
| 2006/0267560 A1 | 11/2006 | Rajda et al. | 323/209 |
| 2007/0216164 A1* | 9/2007 | Rivas et al. | 290/44 |
| 2008/0054641 A1 | 3/2008 | Voss | 290/44 |
| 2008/0157529 A1* | 7/2008 | Rivas et al. | 290/44 |
| 2008/0252076 A1 | 10/2008 | Fortmann et al. | 290/44 |

FOREIGN PATENT DOCUMENTS

| | | |
|---|---|---|
| DE | 197 39 164 A1 | 3/1999 |
| EP | 1 286 048 A1 | 2/2003 |
| EP | 1 508 951 A1 | 2/2005 |
| EP | 1 643 609 A2 | 4/2006 |
| GB | 2 410 386 A | 7/2005 |
| GB | 2 411 252 A | 8/2005 |
| WO | 01/25628 A2 | 4/2001 |
| WO | WO 03/058789 A1 | 7/2003 |
| WO | WO 2004/070936 A1 | 8/2004 |
| WO | 2004/079891 A1 | 9/2004 |
| WO | WO 2004/098261 A2 | 11/2004 |
| WO | WO 2004/107556 A1 | 12/2004 |
| WO | WO 2005/015012 A1 | 2/2005 |
| WO | WO 2005/027301 A1 | 3/2005 |
| WO | 2005/031160 A2 | 4/2005 |
| WO | WO 2004/040748 A1 | 5/2005 |
| WO | WO 2005/099063 A1 | 10/2005 |
| WO | 2006/113964 A1 | 12/2005 |
| WO | WO 2006/069569 A1 | 7/2006 |

OTHER PUBLICATIONS

Andreas Petersson, Analysis, Modeling and Control of Doubly-Fed Induction Generators for Wind Turbines, Goteborg, Sweden 2005, pp. 1-166.

Matsuzaka et al., EWEC'89, European Wind Energy Conference and Exhibition, pp. 608-612.

G. Celli, et al.: "Optimal Participation of a Microgrid to the Energy Market with an Intelligent EMS"; Nov. 29, 2005; pp. 1-6; XP010914083.

Bauer P et al: "Evaluation of electrical systems for offshore windfarms" Industry Applications Conference, 2000. Conference Record of the 2000 IEEE October 8-12, 2000, Piscataway, NJ, USA, IEEE, vol. 3, October 8, 2000 (Oct. 8, 2000), pp. 1416-1423, XP010521303.

A. Ansel, B. Robyns: "Modelling and simulazion of an autonomous variable speed micro hydropower station" Elsevier, Apr. 17, 2006 (Apr. 17, 2006), XP002467010.

Khatounian F et al: "Design of an Output LC Filter for a Doubly Fed Induction Generator Supplying Non-linear Loads for Aircraft Applications" Industrial Electronics, 2004 IEEE International Symposium on Ajaccio, France May 4-7, 2004, Piscataway, NJ, USA, IEEE, May 4, 2004 (May 4, 2004), pp. 1093-1098, XP010874479.

Patin N et al.: "Analysis and control of a cascaded doubly-fed induction generator", 2005.

Khatounian F et al.: "Control of a Doubly Fed Induction Generator for Aircraft Application", 2003.

Nishio T et al.: "Control Characteristics of an Adjustable Speed Generation System With a Flywheel Excited by a DC Link Convertor", Aug. 9, 1997.

Miller N et al.: "Dynamic Modeling of GE 1.5 and 3.6 MW Wind Turbine-Generators for Stability Simulations", Jul. 2003.

International Search Report and Written Opinion, dated May 29, 2008, for PCT/IB2007/002905.

Invitation to Pay Additional Fees and Partial International Search Report, dated Jun. 2, 2009, for PCT/IB2007/002872.

Lie Xu, Bjarne R. Andersen: "Grid connection of large offshore wind farms using HVDC"; Wind Energy [Online]; Dec. 1, 2005; XP002524788.

Hansen L H et al: "Generators and power electronics technology for wind turbines"; IECON '01; Proceedings of the 27th Annual Conference of the IEEE Industrial Electronics Society; Denver, CO; Nov. 29-Dec. 2, 2001; [Annual Conference of the IEEE Industrial Electronics Society], New York, NY: IEEE, US, vol. 3, Nov. 29, 2001, pp. 2000-2005; XP010571723.

* cited by examiner

LOW VOLTAGE RIDE THROUGH SYSTEM FOR A VARIABLE SPEED WIND TURBINE HAVING AN EXCITER MACHINE AND A POWER CONVERTER NOT CONNECTED TO THE GRID

BACKGROUND OF THE INVENTION

1. Field of the Invention

Methods and apparatuses consistent with the present invention relate to the field of variable speed wind turbines, and more particularly, to a variable speed wind turbine comprising a doubly fed induction generator (DFIG), an exciter machine, an intermediate static converter not connected to the grid and a control system to keep the doubly fed induction generator connected to the grid during a low voltage event, and a method implementing the same.

2. Description of the Related Art

In the last few years, wind power generation has increased considerably worldwide. For this reason, grid regulation companies have modified wind turbine electrical grid connection specifications in order to avoid disconnecting a wind turbine from the grid when a low voltage event or some kind of disturbance occurs in the grid. Thus, other new requirements are demanded of the wind turbines with respect to their contribution to the grid's stability when voltage disturbances occur.

Normally, when a grid fault occurs in a doubly fed system, the over-current converter protection switches-off the converter. This protection is activated because the rotor current cannot be regulated by the rotor side converter due to the short circuit which occurs in the stator side of the doubly fed generator. However, this switching disabling is not enough to protect the system because the rotor current flows thorough the converter diodes to the DC Bus circuit, increasing the DC BUS Voltage. This over voltage could damage the converter components. For this reason, the rotor is short circuited and the stator of the generator is disconnected from the grid. This type of control has been implemented in doubly fed wind turbine systems until recently. However, the growth of wind power generation is forcing the creation of new grid code specifications, so the wind power generation must adapt to these new requirements. These requirements are focused on two main points: no disconnection of the wind turbine from the grid and the wind turbine's contribution to the grid stability.

Many solutions have been developed by the different wind turbine manufacturers in order to satisfy the new grid code requirements. Some of these solutions are described in the following documents:

U.S. Pat. No. 6,921,985: This document shows a block diagram where the inverter is coupled to the grid. An external element from the converter like a crowbar circuit is coupled with the output of the rotor of the generator. This crowbar circuit operates to shunt the current from the rotor of the generator in order to protect the power converter when a grid fault happens and to keep the system connected to the grid.

US 2006/016388 A1 This document shows a block diagram where the inverter is coupled to the grid. An external element from the converter like a crowbar circuit is connected to the rotor of the generator. This crowbar circuit is used to electrically decouple the converter from the rotor windings when a low voltage event occurs.

U.S. Pat. No. 7,102,247: This document shows two block diagrams with different configurations. Both of them show a converter connected to the grid (V1, V2, and V3). Two external elements are connected in order to maintain the system connection to the grid when a grid fault occurs. In this document, a crowbar circuit with resistance is shown and some extra elements are included in the BUS system. These additional elements are activated when a grid fault occurs.

WO 2004/098261: This document shows a block diagram where a converter is connected to the grid. This document shows the crowbar circuit connected to the BUS system. This crowbar circuit is activated when the BUS voltage rises after a low voltage event.

However, every solution developed and described in these documents and in other documents such as WO2004/040748A1 or WO2004/070936A1 has a common feature: all the solutions include power electronic converters directly connected to the grid. This feature is the source of a very important issue when a transient voltage occurs in the grid. As will be explained, this grid side converter presents a functional limitation when a fault occurs, because the grid side converter is going to operate with a reduced grid voltage (depending on the grid fault), so its energy evacuation capacity is reduced. Currently, when a grid fault occurs, the generator demagnetizing energy is sent to the BUS and due to the grid side converter limitation, the BUS voltage rises and could damage converter components. For this reason, these solutions include some extra elements connected mainly to the rotor or BUS system. These extra elements absorb the generator demagnetizing energy when a grid fault occurs in order to keep the wind turbine connected to the grid and, thus, satisfy the new grid code specifications. All these elements are normally formed from a combination of passive elements, like resistors, and active elements, like switches.

In these types of solutions, every disturbance or fluctuation occurring in the grid directly affects the grid side converter, so its current limitation implies that the performance of the wind turbine during a grid fault is not completely optimized.

SUMMARY OF THE INVENTION

Exemplary embodiments of the present invention described here overcome the above disadvantages and other disadvantages not described above. Also, the present invention is not required to overcome the disadvantages described above, and an exemplary embodiment of the present invention may not overcome any of the problems described above. Accordingly, in the exemplary embodiments described here, the performance of the wind turbine during grid faults is optimized because there are no power electronics connected to the grid. The present system with an exciter machine, guarantees that the exciter side converter works every time with a stable voltage.

A control method to maintain the doubly fed generator connected to the grid when a grid fault occurs is provided. The exemplary embodiments described here are based on the topology described in U.S. application Ser. No. 11/477,593, which is herein incorporated by reference. The method described here does not need any extra elements and uses an exciter machine to convert the electrical energy (due to the generator demagnetizing) into mechanical energy.

Furthermore, a system is described here which uses an exciter machine as a power supply to generate different stable supplies.

According to one aspect of an exemplary embodiment described here, there is provided a variable speed wind turbine with a doubly fed induction generator, having at least one or more blades, one or more generators, one or more exciter machines coupled to the drive train, one or more power electronic converters joined by a DC link Bus with one of the AC sides of the converter connected to the rotor circuit of the doubly fed induction generator, and the other AC side connected to the exciter machine, for controlling voltage disturbances or grid faults in order to keep the wind turbine connected to the grid.

According to this topology, power electronics are not connected to the grid. Thus, power is only delivered to the grid through the stator of the doubly fed induction generator and voltage disturbances do not directly affect the exciter side converter.

According to this aspect, the generator demagnetizing energy is re-circulated through the power electronics and converted into mechanical power through the exciter machine when a grid fault occurs. The exciter machine transforms the electrical energy into kinetic energy during a low voltage event. So, the main control unit commands the two power electronic converters, by controlling the rotor currents on one side of the converters and the exciter side currents on the other side of the converters, establishing that rotor currents flow to the exciter machine during a low voltage event and converting this energy into kinetic energy.

Another aspect provides that the exciter machine side converter operates at any time with a stable voltage, so all the power capacity of the converter is kept during voltage disturbances. To the contrary, the majority of recent solutions have a grid side converter having a power capacity that is limited to the grid residual voltage. So, within the present invention the performance of the variable speed wind turbine may be improved considerably during voltage disturbances.

Another aspect is using the exciter machine voltage as a power supply to provide power to the different elements of the variable speed wind turbine, once the system reaches a minimum speed. A feature of this system is that such a power supply is absolutely independent of the grid. Therefore, disturbances occurring in the grid do not affect this power supply.

It is to be understood that both the foregoing general description and the following detailed description are exemplary and explanatory only and are not restrictive of the invention, which is defined by the claims.

BRIEF DESCRIPTION OF THE DRAWINGS

The incorporated drawings constitute part of one or more exemplary embodiments of the invention. However, they should not be taken to limit the invention to a specific embodiment. The invention and its mode of operation will be more fully understood from the following detailed description when taken with the incorporated drawings in which like reference numerals correspond to like elements.

DETAILED DESCRIPTION

A variable speed wind turbine and its control mode when voltage disturbances occur in the grid are described below. Several drawings will be referenced only as illustration for the better understanding of the description. Furthermore, the same reference numbers will be used along the description referring to the same or like parts.

Figure 1:
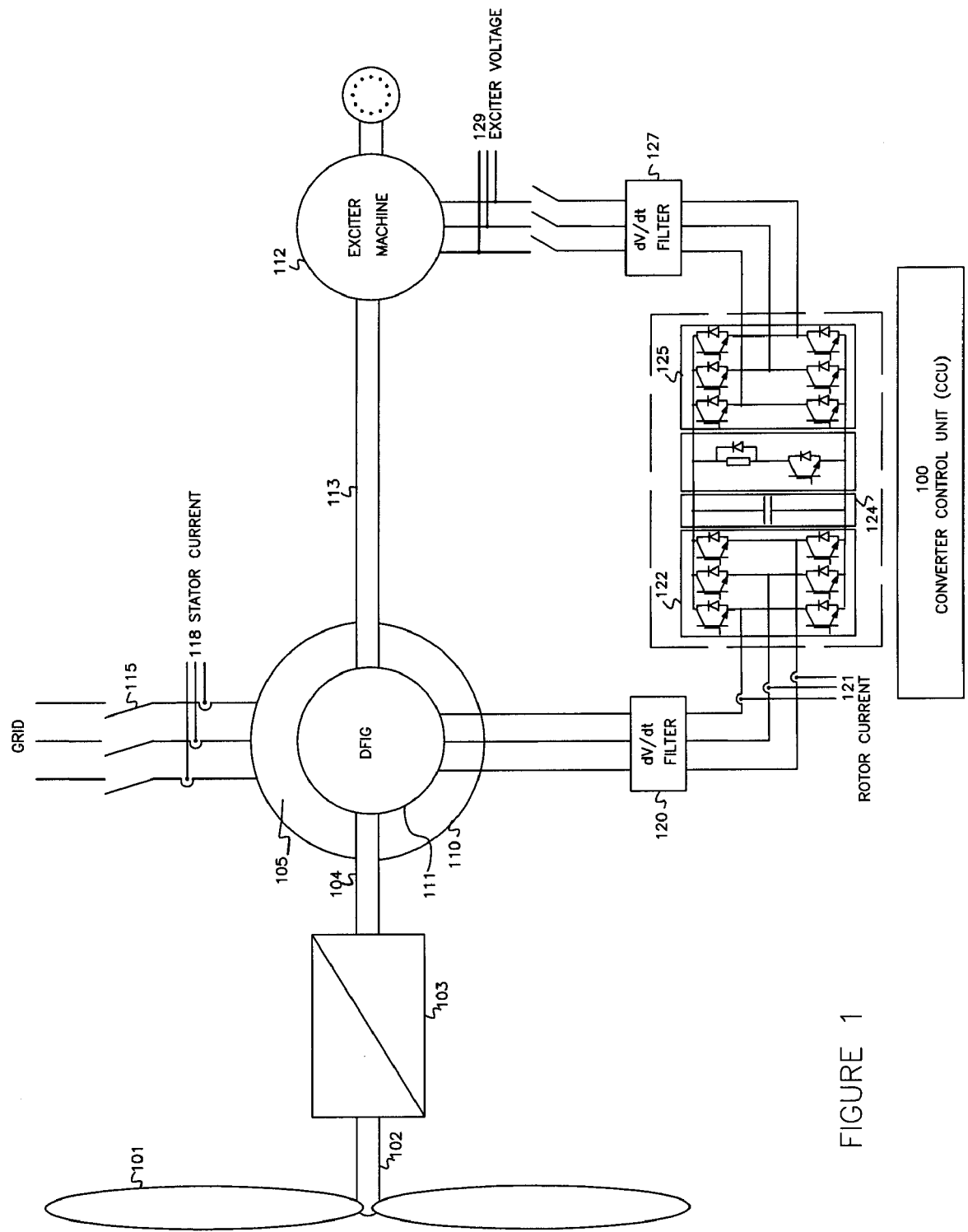
FIG. 1: Illustrates a circuit diagram for a variable speed wind turbine having an exciter machine and a power converter that is not connected to the grid, according to one exemplary embodiment.

The variable speed wind turbine generator system is broadly shown in FIG. 1. In this exemplary embodiment, the variable speed system comprises one or more rotor blades (101) and a rotor hub which is connected to a drive train. The drive train mainly comprises a turbine shaft (102), a gearbox (103), a rotor shaft (104), and a doubly fed induction generator (105). The stator of the doubly fed induction generator (110) can be connected to the grid by using one or more contactors or circuit breakers (115). The system also comprises an exciter machine (112) such as an asynchronous machine, a DC machine, a synchronous (e.g. permanent magnet) machine, or a reversible electrical machine that functions as either a motor or a generator, which is mechanically coupled to the drive train. As shown in FIG. 1, the exciter machine (112) can be coupled to the drive train by way of a shaft (113) connected on one end to the exciter machine and connected at the other end to the rotor of the DFIG (110, 111). The exciter machine is also connected to two active electronic power converters (122, 125) joined by a DC link Bus (124) (i.e. a back to back converter) with one of the AC side connected to the rotor circuit of the doubly fed induction generator and the other AC side connected to the exciter machine (112).

Alternatively, a cycloconverter, a matrix converter or any other kind of bi-directional converter may be connected instead of a back to back converter. A converter control unit (CCU) (100) carries out the power regulation of the doubly fed induction generator and the exciter machine. The system comprises filters such a dV/dt filter (120) which is connected to the rotor circuit of the doubly fed induction generator in order to protect it against abrupt voltage variations produced by the active switches of the power electronic converter. Furthermore, a dV/dt filter (127) is connected between the electronic power converter and the exciter machine.

Figure 2:
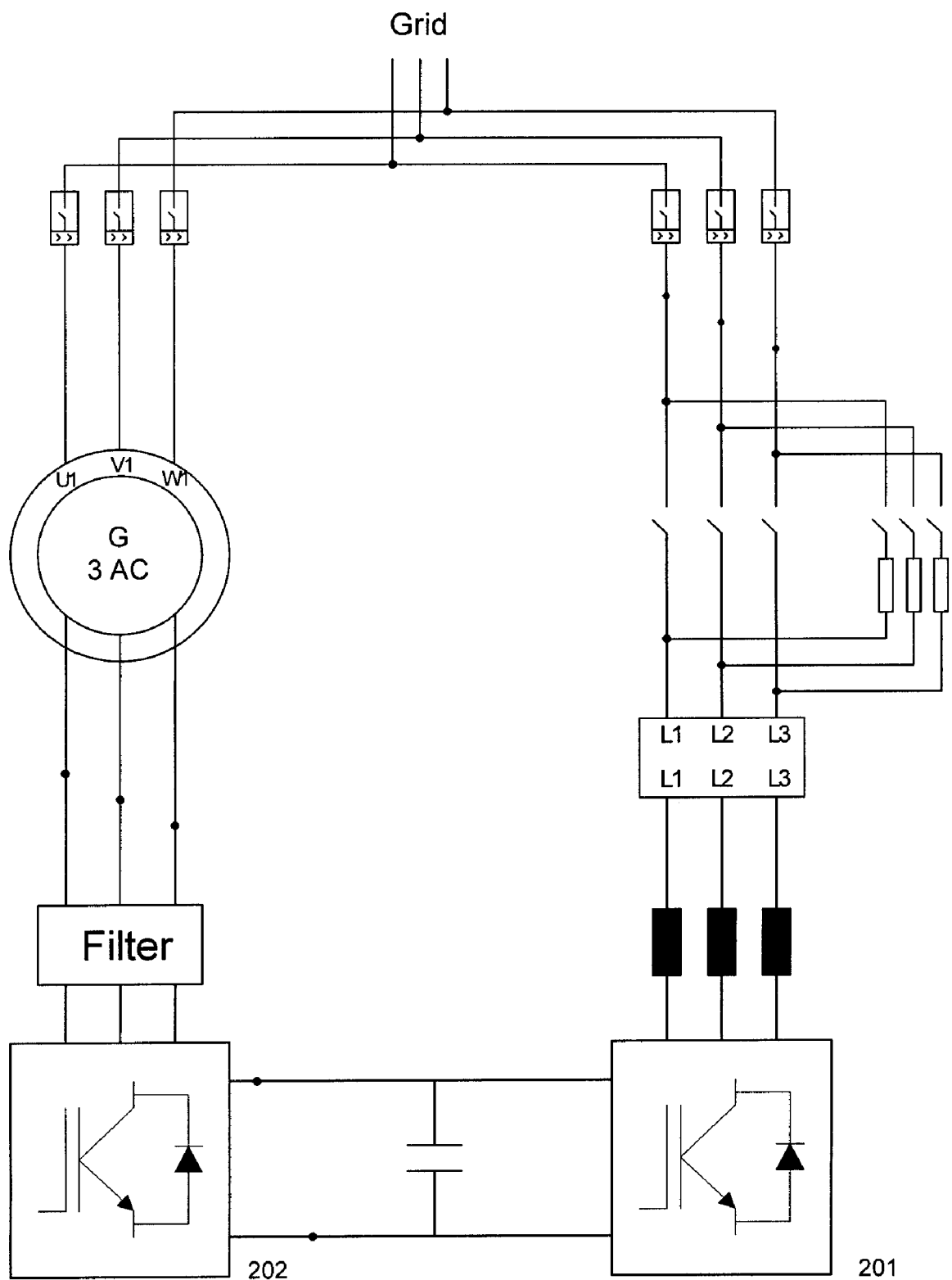
FIG. 2: Illustrates one implementation of a circuit diagram for a variable speed wind turbine having a conventional topology where a power converter is connected to the grid.

A further aspect of this exemplary embodiment is that there is no power converter connected to the grid. In FIG. 2, a classic doubly fed induction system is shown. The power converter (201) is connected to the grid, so grid fluctuations affect it. Instead of that, in the present exemplary embodiment the power converter (125) is connected to the exciter machine, so it may work with a stable voltage, totally independent of the grid voltage.

Figure 3:
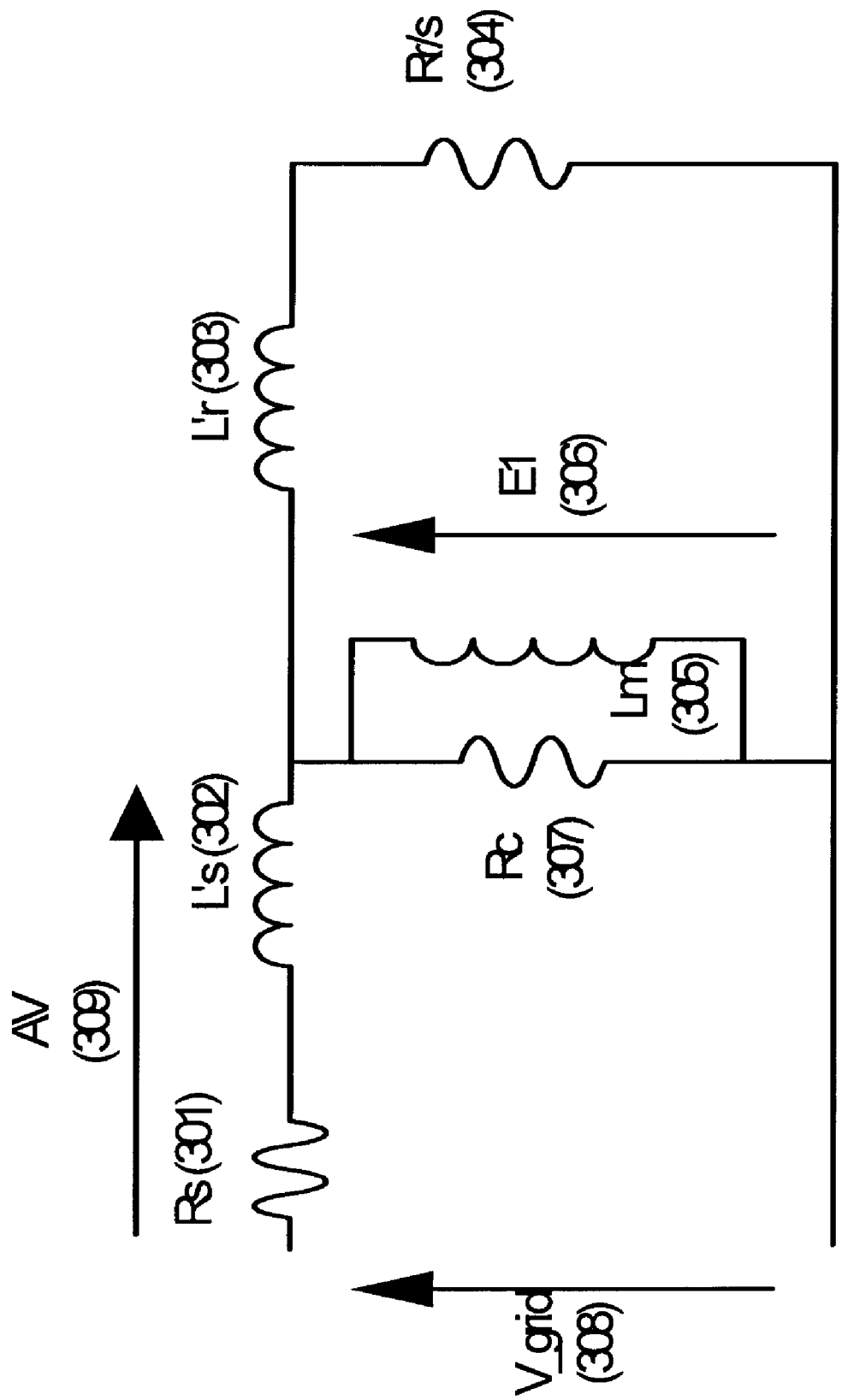
FIG. 3: Illustrates the electrical equivalent circuit of an asynchronous machine.

Another exemplary embodiment of the present invention provides a method which may be used when a grid fault occurs in the grid. During such an event, stator currents, rotor currents and rotor voltage show a first transition whose duration and magnitude is dependent on the electrical machine parameters R's (301), Ls (302), L'r (303), Rr/s (304), Lm (305), Rc (307). An equivalent electrical circuit of an asynchronous machine is shown in FIG. 3 which includes such electrical parameters: the impedance of the grid and the profile of the voltage disturbance: slew rate, depth and instant. So, in this exemplary embodiment of the present invention, during this first transition, the exciter machine converts the electrical energy due to the generator demagnetizing into mechanical energy.

When a low voltage event occurs, the magnetizing branch (305) of the asynchronous machine (110) is going to try to keep the flux in the machine. This flux can not change instantaneously so it will appear as a differential voltage (309) between the grid voltage (308) and the magnetizing voltage (307) in the machine. This voltage (309) is proportional to the flux and the rotational speed. This differential voltage (309) will generate an over current in the stator, only limited by the stator leakage inductance (302) and the stator resistance (301). Due to the relation between the stator and the rotor, rather similar to the relation between the primary and the secondary in a transformer, the effect of the transition in the stator currents also appears in the rotor currents.

In the case of a doubly fed generator, the rotor of the generator is electrically connected to an electronic power converter. So, rotor currents during this transition, due to the generator demagnetizing, flow from the rotor to the DC Bus System through the power electronic converter. In the conventional solutions the grid side converter is not able to evacuate this energy because the grid residual voltage is reduced, so the DC voltage rises and the power electronic elements can be damaged.

To solve the mentioned problem, the different solutions developed need some extra systems to absorb this energy transition due to the imposed limitation of having a second power electronic converter connected to the grid. Aforementioned patents U.S. Pat. No. 6,921,985, US2006/016388A1, U.S. Pat. No. 7,102,247, WO2004/098261 explain different solutions. However, those configurations have a much reduced energy evacuating capacity. For this reason, when a low voltage event occurs this energy must be dissipated in passive elements because otherwise the DC Bus system and converter switches can be damaged. These elements could have different topologies and could be connected to the rotor or to the DC Bus system.

4.1 Grid Fault Operation

Furthermore, in this exemplary embodiment when a low voltage event occurs, the operation has two processes. These processes may occur at the same time but will be explained separately for a better understanding:

First process: Energy transfer between the rotor circuit and the mechanic kinetic system through the converter system and the exciter machine.

Second process: Getting the system into the nominal conditions in order to generate the currents and power according to the different requirements.

First Process

In this exemplary embodiment, there is no limitation as in other solutions. The exciter side converter (125) maintains its energy evacuation capacity because the voltage at the exciter machine terminals (129) are maintained stable or at least in a working band range. This voltage depends mainly on the speed, so stability is guaranteed by the drive train inertia, so the eventual speed fluctuations when a low voltage event occurs need not be significant in order to drastically change the voltage.

In one exemplary embodiment, the energy due to the demagnetizing of the doubly fed generator (110) during the low voltage event flows through the converters (122, 125) and the exciter machine (112) is converted into mechanical energy. So, all the energy is transferred to the drive train. When a low voltage event occurs, due to an over voltage generated in the rotor (111), rotor currents (121) flow to the DC Bus system (124) through the rotor side converter (122, 202). In order to recover this first transition in the smallest possible time, the exciter side converter (125) could work at its maximal current capacity, keeping the BUS voltage in control at all times. This current limit is calculated by the main control unit taking charge of the operating working conditions. When the exciter voltage (129) is maintained in a stable condition, the converter (125) has a large capacity for energy evacuation. This energy is sent to the exciter which will store it as kinetic energy. So, providing this maximum capacity allows this first transition to be reduced to some milliseconds.

Figure 6:
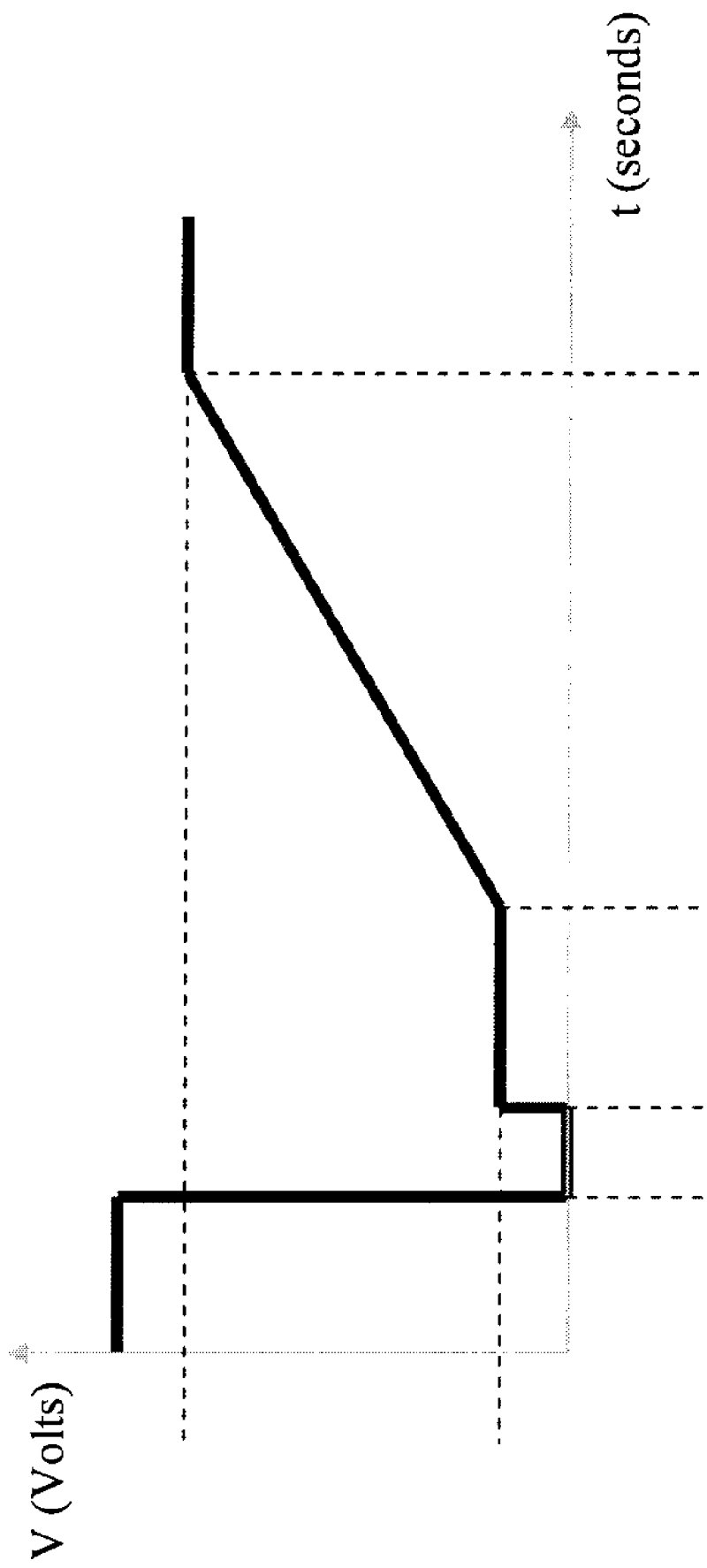
FIG. 6: Is a graph of a typical voltage profile to be fulfilled and required by some grid connection codes.
Figure 8:
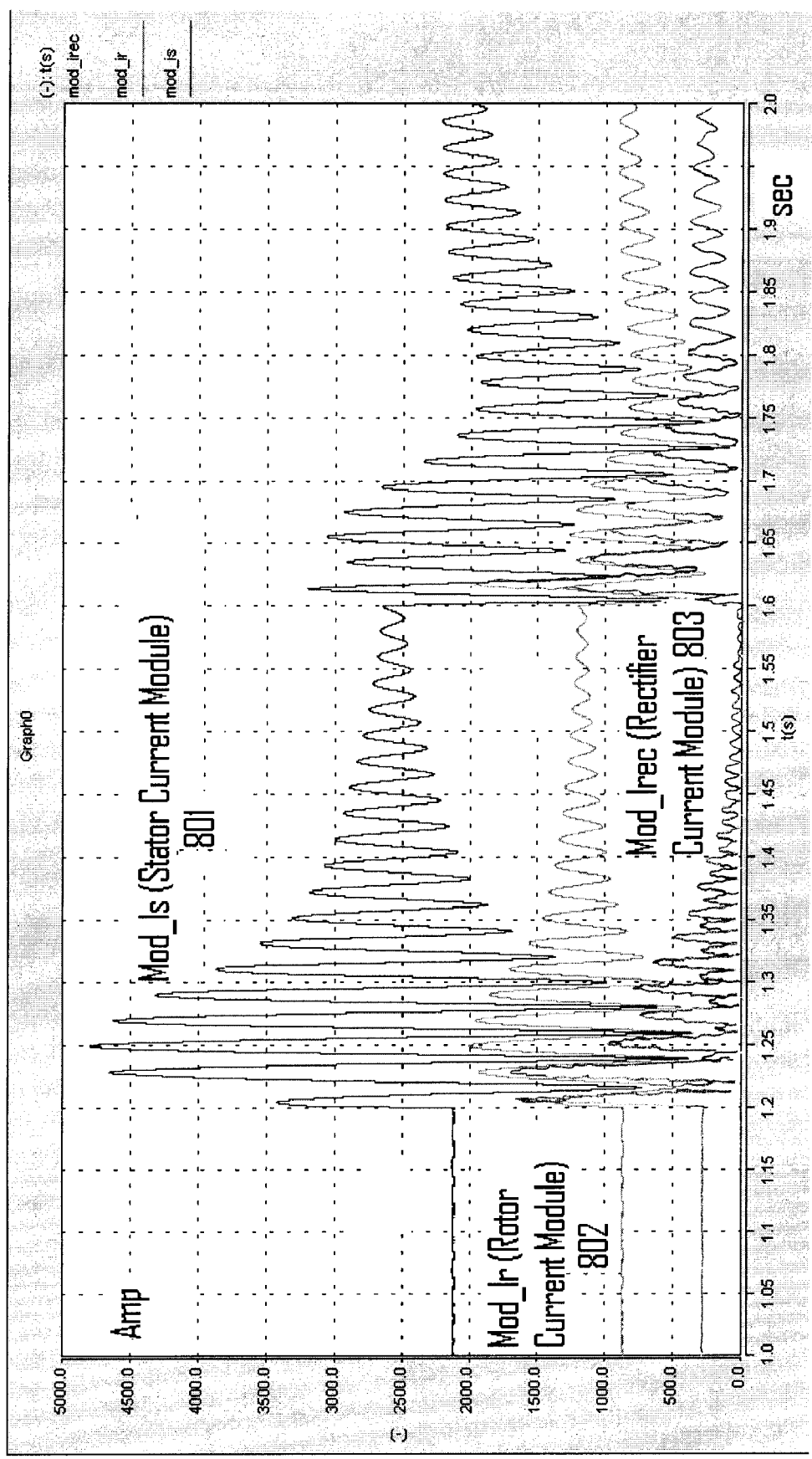
FIG. 8: Is a graph of an example of the rotor, stator and exciter currents during a grid fault.

When a grid fault occurs in the grid, as is shown in FIG. 6 which shows a typical profile for a grid fault, the stator, rotor and exciter side converter currents (801), (802), (803) present an electrical evolution which is shown in FIG. 8. In this figure it can be seen how currents flow from the rotor to the exciter machine. The exciter side converter operates at its maximum current capacity during the approximately first 50 milliseconds in order to evacuate all the energy due to the generator demagnetizing. The main control unit makes the converter (125) work at this maximum current. The time working at this current can be varied depending on the low event fault characteristic and on the electrical system parameters.

Figure 7:
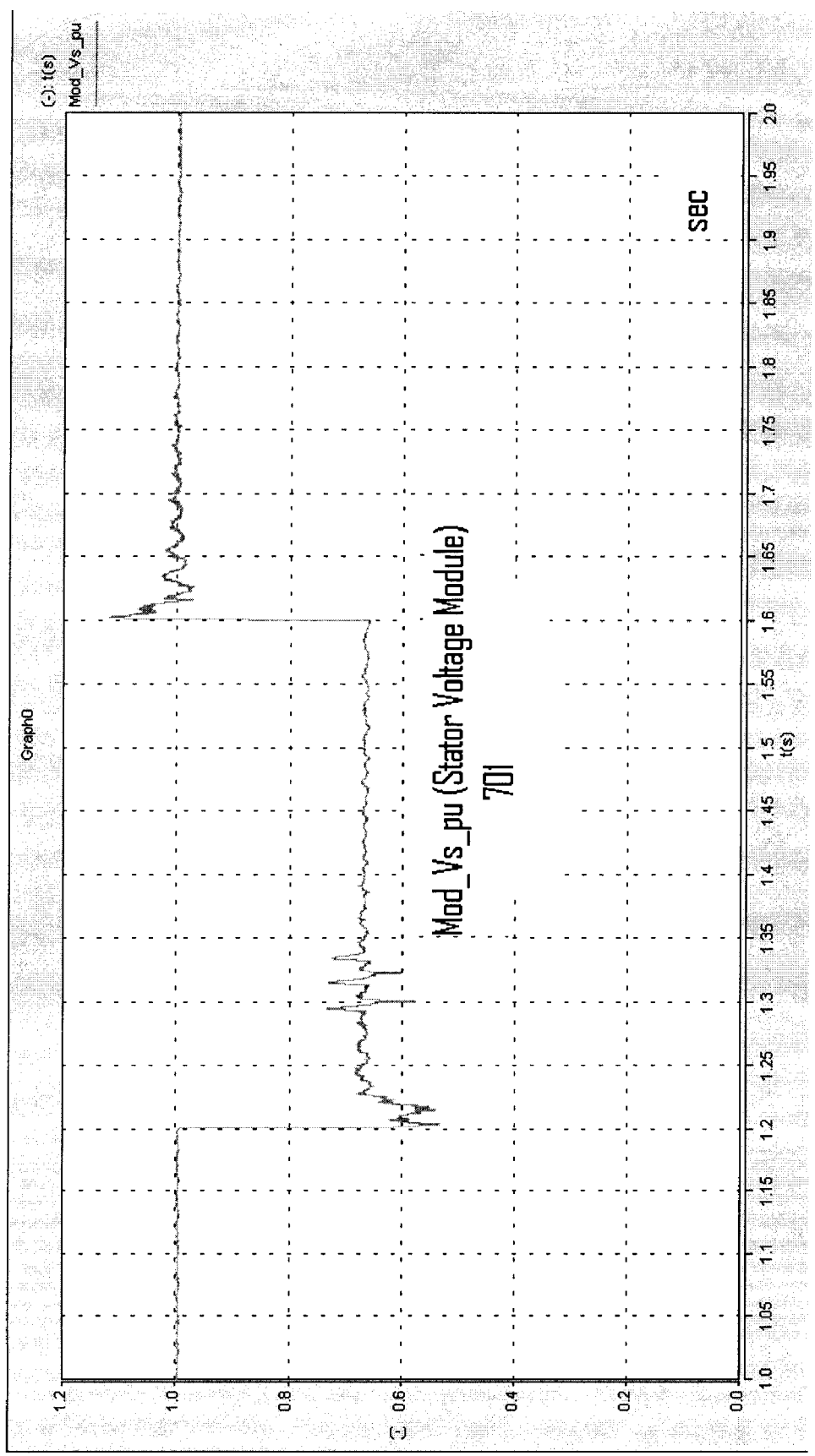
FIG. 7: Is a graph of an example of the Stator Voltage of the doubly fed induction generator of one exemplary embodiment during a grid fault.

The oscillation that appears in the currents corresponds to the generator mechanical rotating frequency. The exciter side converter current (803) approaches zero once the generator is completely demagnetized. Furthermore, at the same time as the low voltage event occurs, the rotor side converter tries to generate the nominal reactive current according to a typical specification. So, the final medium values of the stator and rotor currents correspond to the system nominal current conditions. The oscillations are deadened by control as it will be explained later. The effect of this reactive current generation can be seen in FIG. 7, where the stator voltage is shown. In approximately the first 25 milliseconds, the stator voltage drops 50%, and due to the grid support strategy, generating reactive current, the stator voltage rises to 65% with respect to the nominal value. A grid support strategy, supplying reactive current to the grid has been explained but other control strategies could be taken during the grid event.

Figure 4:
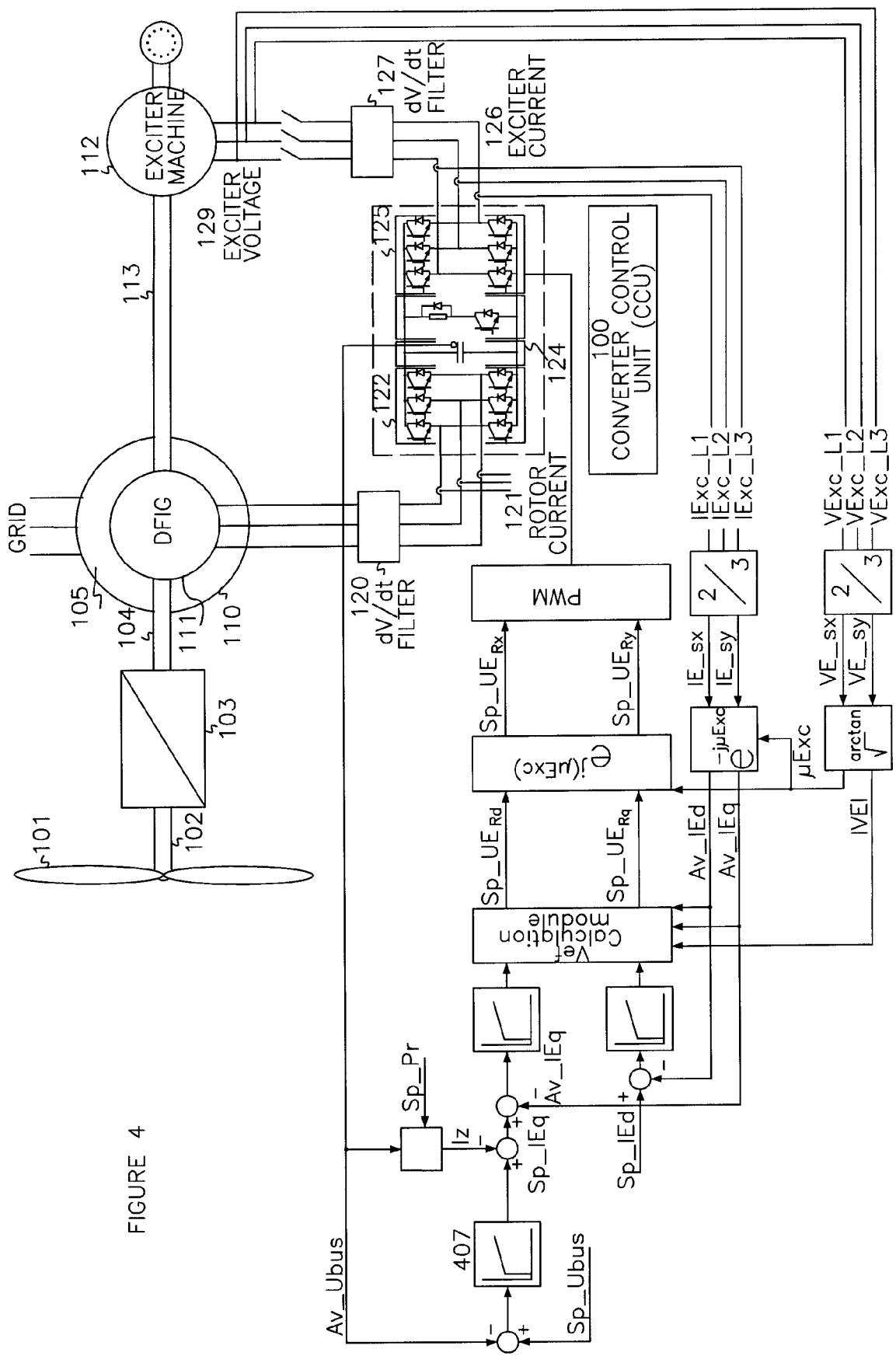
FIG. 4: Illustrates a block diagram of one exemplary embodiment of the Exciter Machine Controller.

In one exemplary embodiment, the exciter side converter (125) operation is controlled by the main control unit (100) which regulates how the energy is evacuated to the exciter machine by controlling the active switches of the power electronic converter. FIG. 4 shows how the switches of the power converter (125) are controlled. In order to evacuate this energy very fast, low voltage algorithm detection and the maximum instantaneous current calculation available by the switches, set by the DC Bus regulator (407), are used by the control system in the main control unit. This low voltage algorithm is based on the measured stator and rotor currents. The main control unit (100) establishes the maximum current that may be supplied to the switches of the converter (125) based on the semiconductor temperature limit, the switching frequency and other parameters. In one exemplary embodiment, the switching frequency could be variable. So, the DC Bus regulator (407) establishes a Sp_IEq which is the real current to be transferred to the exciter machine (112). In one exemplary embodiment this Sp_IEq is the maximum current available by the converter (125).

In one exemplary embodiment, the main control unit (100) establishes the time the exciter side converter (125) is working at its maximum current. In one exemplary embodiment, this time is fixed and could be fixed and calculated by the main control unit. In one exemplary embodiment, this time could be variable and it is going to depend on the electrical system variables: Av_Ubus, rotor current (121) and stator current (118) and other variables. In one exemplary embodiment the following criteria is met, Av_Ubus<Percentage of the maximal BUS Voltage;
Rotor Current (121)<Percentage of the maximal rotor current;
Stator Current (118)<Percentage of the maximal stator current.

Second Process

One effect generated in a doubly fed generator when a grid fault occurs is the oscillation that appears in the currents. This oscillation corresponds to the rotational generator frequency. When a grid fault occurs, the stator flux does not rotate, so it is seen by the rotor as a vector rotating reversely. It is important to reduce this oscillation, or at least compensate for it, through some control mechanisms implemented within the control loops.

The asynchronous machine equations developed in a two axes rotational reference system depend on the rotor current and on the systems electrical parameters.

Consequently, the rotor system will depend on the rotor currents on one side and on the magnetizing current with a frequency dependency on the rotor speed on the other side.

So, when a grid fault occurs, the current regulation loops must detect these oscillations during the fault in order to keep the system under controlled. Once the control system detects these oscillations, it must try to reduce these oscillations to minimize the time of this transition and to carry the system into the conditions required by the different normative.

In one exemplary embodiment, this second process could begin some milliseconds after the first process has started. The main control unit decides when this second process must begin.

During this second process, different strategies may be taken into account.

In one exemplary embodiment, a grid support strategy supplying reactive current or reactive power to the grid may be used.

In another exemplary embodiment, a grid support strategy supplying real current or real current to the grid may be used.

In yet another exemplary embodiment a mixed control strategy may be used, wherein real and reactive current or real and reactive power may be supplied to the grid.

4.2 EMPS System

Further information related to an exemplary embodiment of the present invention is the use of the exciter machine (112) as a power supply to generate different stable supplies. The voltage (129) generated by the exciter depends on the rotational speed, so when the system reaches a certain speed the voltage generated by the exciter generator is enough to generate the power supplies (502), (508), shown in FIG. 5, required by the system.

Figure 5:
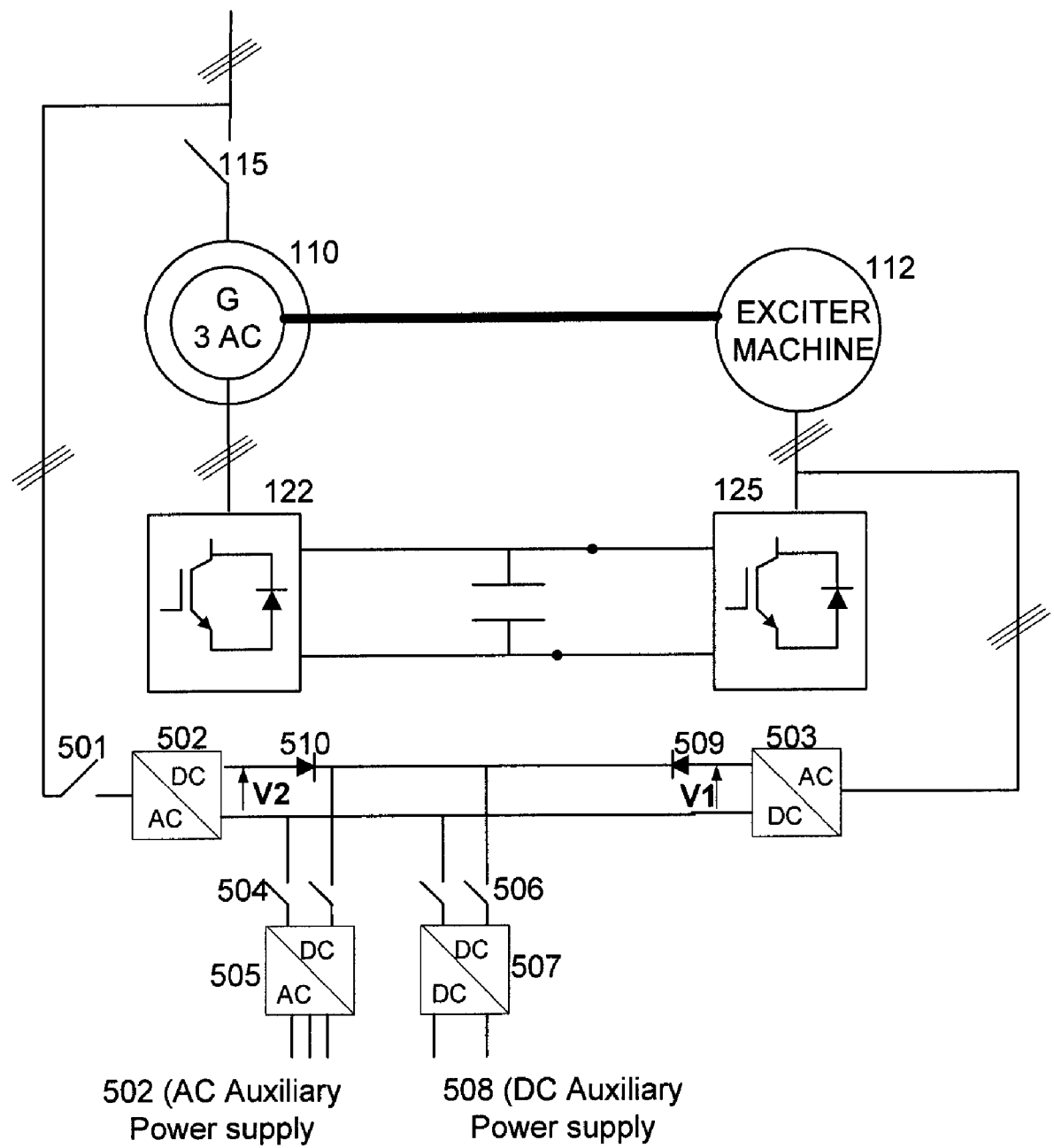
FIG. 5: Illustrates a block diagram of one exemplary embodiment of the Exciter Machine used as power supply.

In one exemplary embodiment illustrated in FIG. 5, the system has two AC/DC systems (503) (502) based on semiconductors which generate two different DC Voltage supplies. Some diodes (509) (510) are placed at the DC output in order to decouple the two voltage sources (AC/DC systems (502), (503)). The system (502) will generate a voltage V2 and the system (503) will generate a voltage V1. So, the DC Voltage supply will be equal to the larger of V1 and V2. Usually V1 is a slightly larger than V2.

From the DC voltage supply, several auxiliary power supply systems can be connected in order to generate the independent auxiliary supplies required for the system. These auxiliary power supply systems are DC/DC (507) or DC/AC (505) systems and are based on semiconductors, passive elements and other electrical elements.

In one exemplary embodiment, some switches or contactors (504) (506) could be placed at the input of the DC/DC or DC/AC systems in order to isolate each system.

In one exemplary embodiment, the auxiliary power supply process has different steps:

The switch or contactor 501 is closed, so the main power supply comes from the grid. The DC/AC system (502) generates a voltage level V2 so the auxiliary power supplies are generated when the contactors (504) (506) are closed. Prior to the generator reaching a set speed value, speed_1 value, the source of the auxiliary power supplies are generated from the grid. The switch or contactor (501) will be always closed while the generator speed is below the speed_1 value.

Once the generator speed reaches the speed_1 value, the AC/DC system (503) generates enough voltage V2 to have a DC Voltage to generate the different auxiliary voltage supplies, the switch contactor (501) then is opened. The auxiliary voltage is generated from the AC/DC system (503) while the generator speed is greater than a speed_1 value.

In one exemplary embodiment, in order to improve the redundancy of the power supply system, the switch or contactor 501 may be kept closed.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method for operating a variable speed wind turbine comprising:
   converting wind energy into mechanical power using a rotor to rotate a drive train;
   converting the mechanical power into electrical power utilising a doubly fed induction generator (DFIG) coupled to the drive train;
   using an exciter machine coupled to the drive train and a power conversion system isolated from the power grid, to receive power generated by a rotor of the DFIG or to provide power required by the rotor of the DFIG;
   transferring electrical energy between the rotor of the DFIG and the drive train, through the power conversion system and the exciter machine in response to a low voltage event in the grid.

2. The method defined in claim 1, further comprising adjusting rotor currents in order to generate desired stator currents to meet grid connection requirements.

3. The method defined in claim 2, wherein the rotor currents are adjusted in order to supply reactive current to the grid during the low voltage event.

4. The method defined in claim 2, wherein the rotor currents are adjusted in order to supply real current to the grid during the low voltage event.

5. The method defined in claim 2, wherein the rotor currents are adjusted in order to supply a mix of real and reactive current to the grid during the low voltage event.

6. The method defined in claim 2 wherein the rotor currents are adjusted in order to supply reactive power to the grid during the low voltage event.

7. The method defined in claim 2 wherein the rotor currents are adjusted in order to supply real power to the grid during the low voltage event.

8. The method defined in claim 2 wherein the rotor currents are adjusted in order to supply a mix of real and reactive power to the grid during the low voltage event.

9. A method for operating a power conversion system defined in claim 1, wherein switching frequencies can be dynamically adjusted and modified.

10. The method defined in claim 6, wherein a switching frequency of an exciter side converter of the power conversion system can be dynamically adjusted and modified.

11. The method defined in claim 6, wherein a switching frequency of a rotor side converter of the power conversion system can be dynamically adjusted and modified.

12. A variable speed wind turbine comprising:
   a rotor shaft including at least one blade;
   a drive train coupled to the rotor shaft, the drive train including a doubly fed induction generator (DFIG), said DFIG having at least a stator connectable to a power grid;
   an exciter machine coupled to the drive train; and
   a power conversion device isolated from the grid and electrically coupled to a rotor of the doubly fed induction generator and to the exciter machine to transfer electrical power between the rotor and the exciter machine;
   wherein the exciter machine is used as a power supply for components of the wind turbine when the generator speed is at or above a predefined value.

13. The variable speed wind turbine system of claim 12 further comprising:
   means for generating an alternating current (AC) and a direct current (DC) power in response to the generator speed being at or above a predefined value.

14. The variable speed wind turbine system of claim 12 further comprising:
   means for generating an alternating current (AC) auxiliary power supply; and
   means for generating a direct current (DC) auxiliary power supply.

15. The variable speed wind turbine system of claim 12, further comprising:
   an alternating current/direct current (AC/DC) converter coupled to the exciter machine which generates a direct current (DC) power supply; and
   a direct current/alternating current (DC/AC) converter connected to the DC power supply which generates an alternating (AC) auxiliary power supply.

* * * * *